(12) United States Patent
Carter

(10) Patent No.: US 6,389,550 B1
(45) Date of Patent: May 14, 2002

(54) HIGH AVAILABILITY PROTOCOL COMPUTING AND METHOD

(75) Inventor: Edward D. Carter, Columbia, SC (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/219,757

(22) Filed: Dec. 23, 1998

(51) Int. Cl.7 .............................................. G06F 11/00
(52) U.S. Cl. ................................ 714/1; 714/5; 714/48; 710/1; 709/229
(58) Field of Search ..................... 714/1, 5, 48, 51–57, 714/7, 10, 11, 709; 709/224, 229; 710/1

(56) References Cited

U.S. PATENT DOCUMENTS

| | | | |
|---|---|---|---|
| 5,572,678 A | * 11/1996 | Homma et al. ........ | 395/200.12 |
| 5,586,118 A | * 12/1996 | Hashimoto et al. ......... | 370/451 |
| 5,764,915 A | 6/1998 | Heimsoth et al. | |
| 5,822,531 A | * 10/1998 | Gorezyca et al. ........... | 709/221 |
| 5,937,165 A | * 8/1999 | Schwaller et al. .......... | 709/224 |
| 5,938,733 A | * 8/1999 | Heimsoth et al. ........... | 709/230 |
| 5,941,949 A | * 8/1999 | Pederson .................... | 709/227 |
| 6,097,731 A | * 8/2000 | Aoki .......................... | 370/465 |
| 6,144,999 A | * 11/2000 | Khalidi et al. .............. | 709/219 |
| 6,157,944 A | * 12/2000 | Pederson .................... | 709/204 |

* cited by examiner

Primary Examiner—Thomas Lee
Assistant Examiner—RiJue Mai
(74) Attorney, Agent, or Firm—Steven J. Adamson

(57) ABSTRACT

A protocol for a high availability (HA) computer cluster. The protocol provides an open standard for various platforms and HA application software and provides such features as automatic message resend, communication path analysis and prioritization, independent heartbeat signal monitoring, routing, security and automatic configuration.

15 Claims, 7 Drawing Sheets

HIGH AVAILABILITY PROTOCOL COMPUTING AND METHOD

FIELD OF THE INVENTION

The present invention relates to high availability (HA) computer networks or clusters and, more specifically, to a protocol for use therewith that provides enhanced processing.

BACKGROUND OF THE INVENTION

The term high availability (HA) computer system (or network or cluster) refers to a group of computers that are interconnected in some capacity such that if one or more fail, the remaining computers take over the processing of the failed computer(s).

Currently, failover or redundancy operations are carried out by application software, such as NCR LikeKeeper or MicroSoft Wolfpack, that is based on an open standard. While the open standard is beneficial in that it allows application software to run on a broad base of computers, current practices are disadvantageous in that a significant amount of supporting code has to be written to permit HA application software to run on any particular computer system. In other words, the current open standard for high availability application software is such that every implementation requires a significant amount of supporting code that couples the HA application software to the particular platform on which the HA application software is to be used.

Another disadvantageous aspect of current HA computer arrangements relates to the use of low level system drivers. Most current clustering implementations utilize industry standard communication protocols, such as sockets, to communicate. The communication between clustered servers, therefore, relies on lower level system drivers and protocols such as NetBIOS, TCPIP, Ethernet and others to service their communication needs. This reliance on such an extensive list of lower level drivers significantly decreases the direct control by the HA application software over the communications paths on which it relies to detect server problems. Additionally, these lower level drivers are not only used by the HA application software, but are also used by other application programs. Thus, it is conceivable that the drivers of all the common/networked communication devices could be busy with other application programs when the HA application software needs to attempt a critical communication.

Yet another disadvantageous aspect of current HA computer arrangements relates to processing of the "heartbeat" (HB) signal. The HB signal is a signal that is propagated between computers in a cluster for the purpose of transmitting status information and confirming that each machine is running properly. The HB signal may be propagated over any of the common links of a cluster arrangement and potential links include Ethernet, modem, serial port, parallel port and shared disk links. It is known in the prior art to send a signal over a first link and designate a second link to be implemented when the first link fails. A problem with this approach, however, is that the pre-selected failover or secondary link, may not be the best link at the time of an actual failure. For example, it may be being used by another program, etc., while an adjacent path is available.

It is also known to simultaneously send the heartbeat signal over a plurality of system links (for example, the Ethernet, parallel and serial links). While this procedure increases the probability of a HB signal reaching its intended destination, the procedure is undesirably consumptive of processing resources due to repetitive processing for the multiple links.

A need thus exists for a lower level HA protocol for use in clustered computer arrangements and the like that is efficient, controllable, reliable and secure.

SUMMARY OF THE INVENTION

Accordingly, it is an object of the present invention to provide an improved protocol for use in a high availability (HA) computer system.

It is another object of the present invention to provide a computer for use in a HA computer system that implements such a protocol.

It is another object of the present invention to provide a HA protocol that affords an efficient interface between application software and underlying hardware.

It is also an object of the present invention to provide a HA protocol logic that implements features such as node discovery, failed communication re-transmission, message routing, etc.

These and related objects of the present invention are achieved by use of a high availability protocol computing apparatus and method as described herein.

The attainment of the foregoing and related advantages and features of the invention should be more readily apparent to those skilled in the art, after review of the following more detailed description of the invention taken together with the drawings.

DETAILED DESCRIPTION

Figure 1:
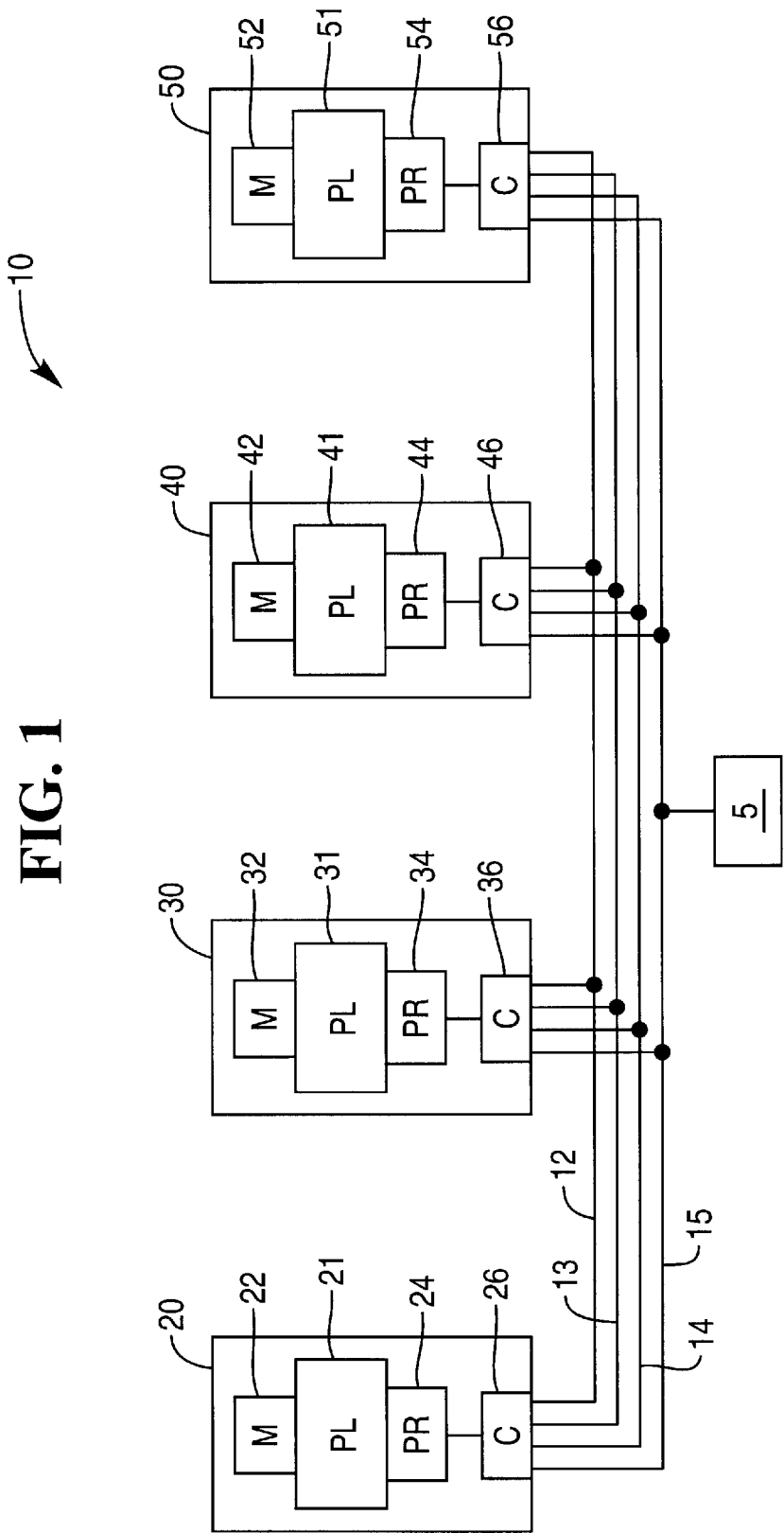
FIG. 1 is a schematic diagram of a computer cluster in accordance with the present invention.

Referring to FIG. 1, a schematic diagram of a high availability (HA) computer cluster 10 in accordance with the present invention is shown. Cluster 10 includes four computers 20,30,40,50. Each of the computers preferably includes processing logic 21,31,41,51 and associated memory 22,32,42,52, protocol logic 24,34,44,54 and communication devices (generally represented with the reference numerals 26,36,46,56) for connection to the other computers and to shared disk 5 or another storage media.

The common links between the computers may include, but are not limited to, serial 12, parallel 13, network 14 (Ethernet, token ring, FDDI, etc.), modem (not shown), and shared disk 15 links.

Protocol logic 24,34,44,54 is coupled to the processing logic and the communication devices as discussed in more detail below and is configured in such a manner as to implement an improved HA protocol. Protocol logic 24,34, 44,54 (referred to collectively in FIG. 2 and elsewhere herein with reference numeral 70) is preferably implemented as software running on a suitable processor. Suitable processors are known in the art and include those made by Intel Corporation. The HA protocol of the present invention provides several desirable features such as reliability, execution speed, automatic redundancy, automatic configurability, security, self-correction, and extensibility, etc.

Figure 2:
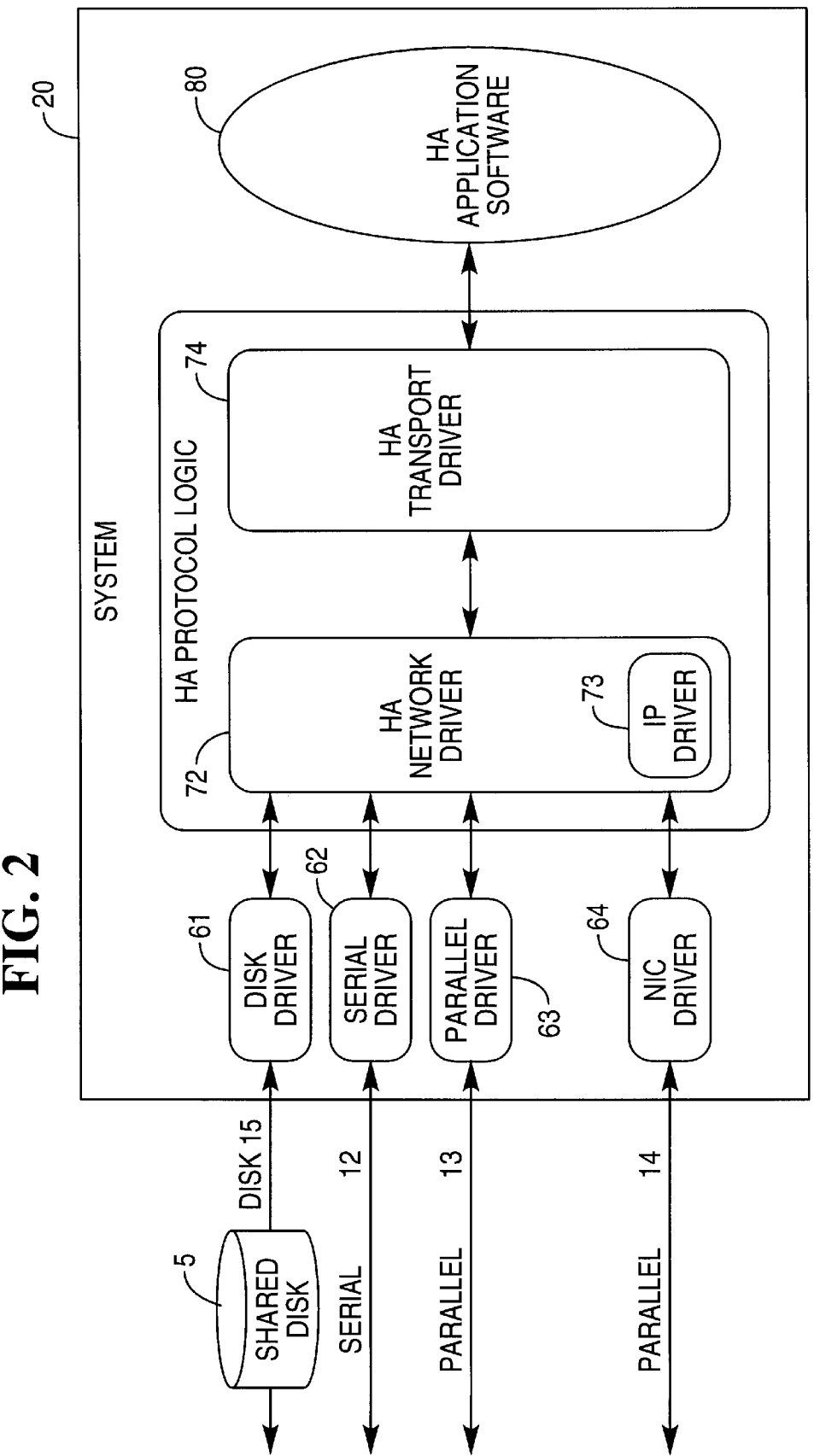
FIG. 2 is a diagram of the components of a computer that implements an HA protocol in accordance with the present invention.

Referring to FIG. 2, a diagram of the components of any of computers 20,30,40,50 that implement HA protocol in accordance with the present invention is shown.

Protocol logic 70 preferably implements the HA protocol using a two-stage approach. The first stage may be referred to as the HA network driver 72 and the second stage may be referred to as the HA transport driver 74. The HA protocol is preferably a routable protocol and hence part of the HA network driver is identified as being implemented as an IP driver 73.

HA network driver 72 provides direct communication between HA transport driver 74 and the individual physical drivers. The network driver provides communication path redundancy by automatically switching to another communication path when a currently used link goes down. The network driver also monitors communication of each common link to determine the best path to use for fast, reliable HA communication.

HA transport driver 74 provides communication between the HA application software 80 and the HA network driver 72. HA transport driver 74 translates commands from the application software into HA protocol messages that are passed down to the HA network driver for delivery. Similarly, HA messages that are received by the transport driver are translated into messages that are delivered to the HA application software. The transport driver is also responsible for providing reliable continuous point to point HA communication between the computers 20,30,40,50 in cluster 10. Security is preferably provided by validating HA messages received from the HA network driver. In addition to passing messages to and from the HA application software, the transport driver preferably includes internal processing logic that is capable of generating messages for the HA software application on the computer on which it is resident and for HA application software on other computers in the cluster.

FIG. 2 illustrates that the protocol logic operates below application software 80 such as high availability failover software or other applications that are executed by processing logic (21,31,41,51 of FIG. 1).

The communication devices that are generally referred to with reference numerals 26,36,46,56 in FIG. 1 preferably support a shared disk, serial port, parallel port and network connection. Each computer 20,30,40,50 preferably includes appropriate devices for each of these communication paths. The drivers include shared disk driver 61, serial driver 62, parallel driver 63 and network (NIC) driver 64. These drivers are coupled between the protocol logic and their respective communication paths.

Information transmitted over these communication paths by the HA protocol logic is preferably sent in a HA "packet."

The form of a HA packet may differ depending on whether it is sent by a non-network driver 61,62,63 or by a network driver 64. The composition of the packets is discussed with reference to FIGS. 3–5, while the formation and processing of these packets is discussed with reference to FIGS. 6–9.

Figure 3:
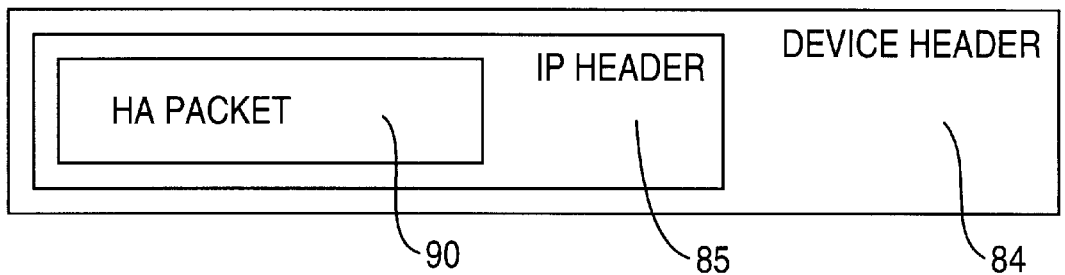
FIG. 3 is a diagram of a HA packet for use with a network medium in accordance with the present invention.

Referring to FIG. 3, a diagram of a HA packet 90 for use with a network medium in accordance with the present invention is shown. Packet 90 is encapsulated within an IP packet 85 and a device header 84 as seen on a typical network segment.

Figure 4:
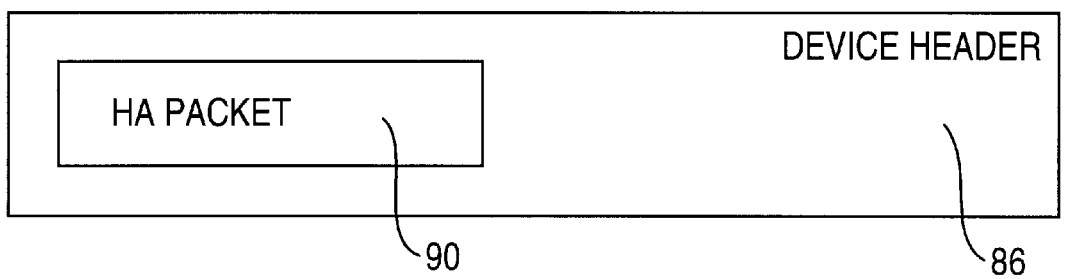
FIG. 4 is a diagram of a HA packet for use with a non-network medium (e.g., parallel, serial, shared disk, etc.) in accordance with the present invention.

Referring to FIG. 4, a diagram of a HA packet 90 for use with a non-network medium (e.g., parallel, serial, shared disk, etc.) in accordance with the present invention is shown. Packet 90 in this context is encapsulated within a special HA physical media header 86 that is used to communicate over non-network segments such as serial and parallel connections and shared disk communication paths.

Figure 5:
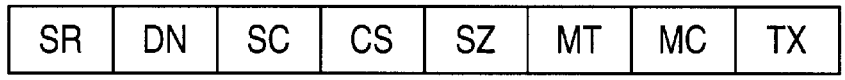
FIG. 5 is a diagram of one embodiment of a HA packet in accordance with the present invention.

Referring to FIG. 5, a diagram of one embodiment of a HA packet 90 in accordance with the present invention is shown. The embodiment of FIG. 5 is representative of one possible arrangement of a HA packet and is provided for pedagogical purposes. It should be recognized that other HA packet arrangements are possible and within the present invention. In the embodiment of FIG. 5, packet 90 preferably includes the following fields:

Source Machine Code (SR): A code for the source machine that is a unique representation of that machine on the network.

Destination Machine Code (DN): A code for the packet destination machine that is a unique representation of that machine on the network.

Security Code (SC): An encrypted code which can be used to authenticate the packet by other systems in the cluster.

Checksum (CS): A value which can be used to verify that the packet is not corrupt.

Size (SZ): Total size of packet.

Message Type (MT): Either SEND or ACKNOWLEDGE.

Message Code (MC): A code describing the reason for the packet being sent or a requested action by the sending system. Values may include:

HELLO—announces system's presence on the network.

CONNECT—system requests the establishment of a heartbeat with another system.

HEARTBEAT—heartbeat between two systems on the network.

UPDATE—something in the cluster has changed.

EXECUTE—execute a program on remote system.

Message Text (TX): Additional information regarding the message code or action requested.

The packet size may vary depending on machine code. Messages that are too long for one packet are preferably split into multiple packets by the HA network driver 72, sent out individually and reassembled at the receiving machine. Some message codes provide basic functionality, while others are available for the HA software to use to provide customization.

Figure 6:
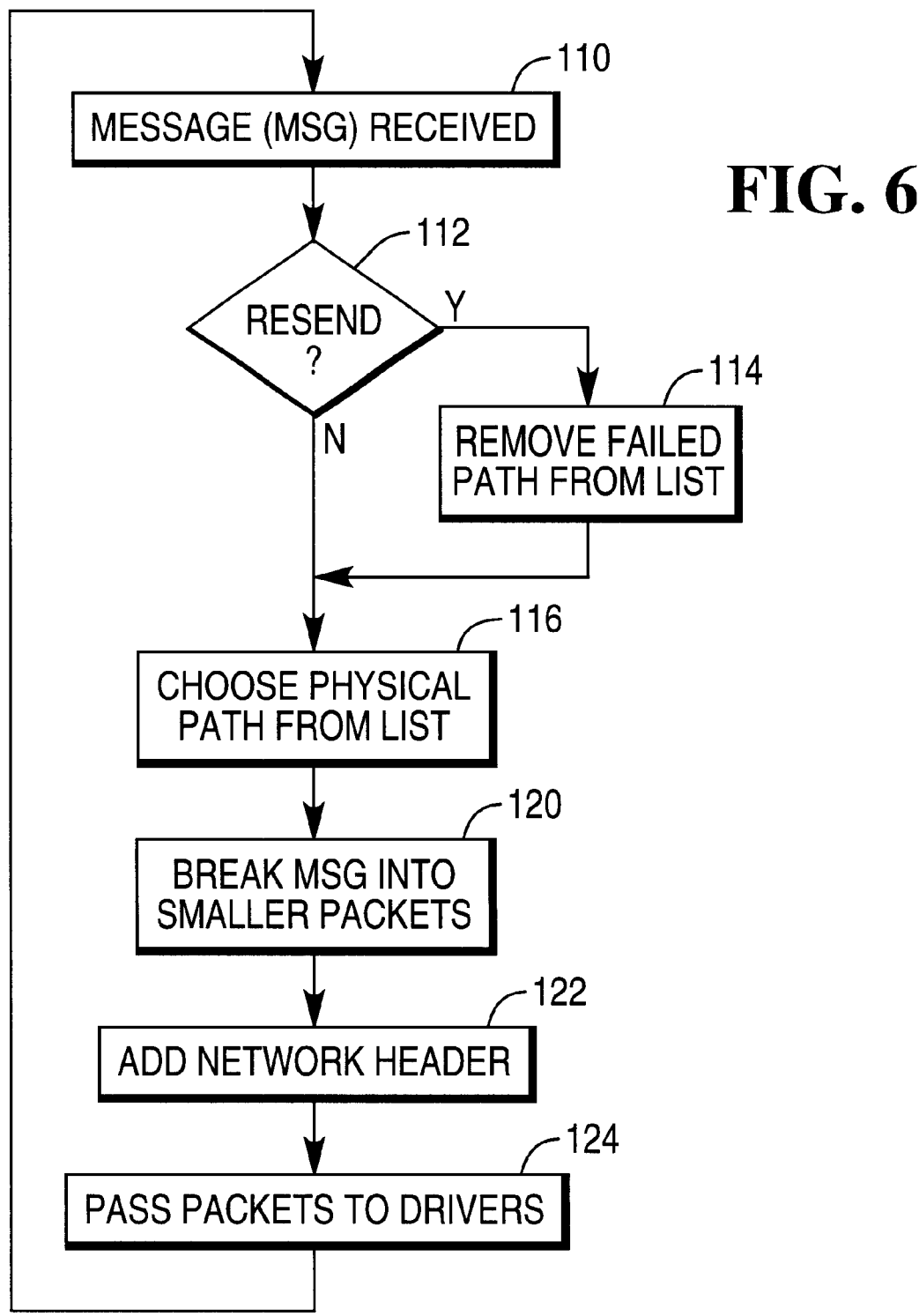
FIG. 6 is a flow diagram of processing in a HA network driver for a send operation in accordance with the present invention.

Referring to FIG. 6, a flow diagram of processing in HA network driver for a send operation in accordance with the present invention is shown. In step 110, a message (MSG) for transmission is received at the HA network driver 72. A determination is made, in step 112, as to whether the MSG is new or from a failed transmission attempt. If the MSG is from a failed transmission attempt, then the path that was used to send the MSG is removed from the list of available paths (step 114).

In step 116, a decision is made as to which path to se in sending the new or resend MSG. HA network driver 72 preferably maintains a table of available communication paths. Each communication path is prioritized based on such criteria as speed and bandwidth, frequency and duration of use by other resources, failure rate, etc.

In step 120, a determination is made as to whether it is necessary to break the MSG into a plurality of packets. A network header is added to each packet (in step 122), if needed, for example, for network transmissions. In step 124, each packet is passed to the appropriate physical driver for transmission and flow returns to step 110 where the HA network driver awaits the next message to be received for transmission.

Figure 7:
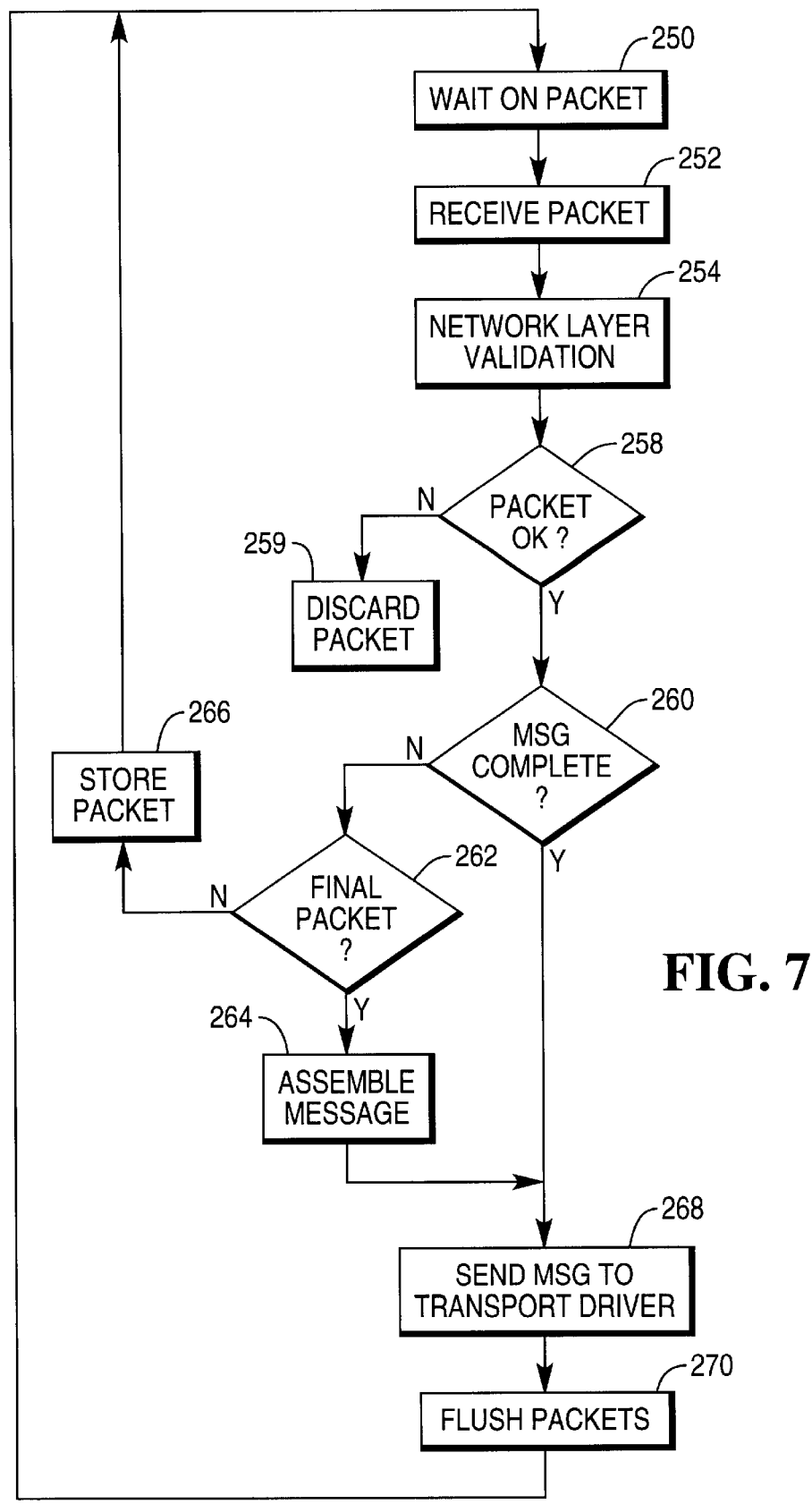
FIG. 7 is a flow diagram of processing in a HA network driver for a receive operation in accordance with the present invention.

Referring to FIG. 7, a flow diagram of processing in HA network driver 72 for a receive operation in accordance with the present invention is shown. In step 250, the driver is in a state of waiting to receive a MSG from one of the physical drivers. In step 252, an incoming packet is received and, if necessary, network layer validation is performed (step 254). Network layer validation may include, for example, evaluating a check sum of an IP header, though the validation method will vary based on the type of transmission medium.

In step 258, a determination is made as to whether the packet is OK based on validation done in the previous step 254. If the packet is not OK, then it is discarded (step 259). In step 260, a determination is made as to whether the MSG is complete (i.e, whether all packets for a single message have been received). If the MSG is complete, then the MSG is sent to the HA transport driver 74 (step 268).

If, in step 260, the MSG is not complete then a determination is made in step 262 as to whether the current packet is the final packet needed to form a complete message. If it is, then in step 264 it is assembled with the preceding packets and sent to the HA transport device (step 268). If a received packet is not the final packet, then that packet is stored (step 266) until it is needed for assembly. It is possible for stored packets to accumulate, for example, in a multi-packet message where the first packets are received, but the later packets are not. In step 270, a flush of stored unused packets is performed to keep the packet storage area clean.

Figure 8:
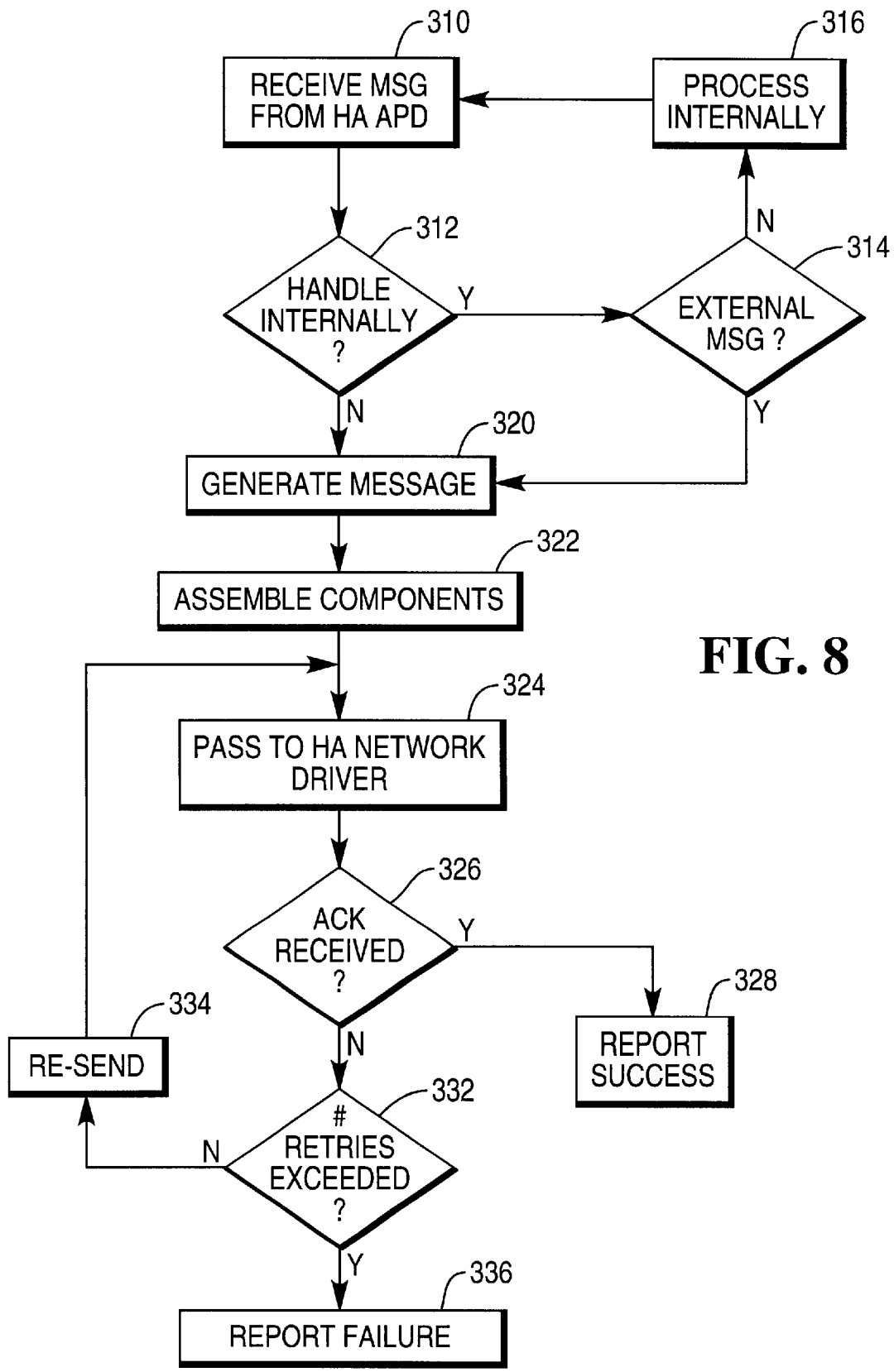
FIG. 8 is a flow diagram of processing within a HA transport driver for a send operation in accordance with the present invention.

Referring to FIG. 8, a flow diagram of processing within HA transport driver 74 for a send operation in accordance with the present invention is shown. In step 310, a MSG is received from HA application software. In step 312, a determination is made as to whether the MSG can be handled internal to the transport driver. An example of a MSG that can be handled internally is a maintain heartbeat command. The HA transport driver is capable of communicating heartbeat signals and monitoring their propagation. The HA transport driver can detect failure of a heartbeat signal and inform the HA application software when a failure occurs. In this manner, heartbeat processing is carried out primarily by the HA protocol, freeing the resources of the host machine for other processing.

If the MSG is to be handled or monitored internally, then, in step 314, a determination is made as to whether an external message need be generated (e.g., for establishing and maintaining a heartbeat signal or the like). If not, the MSG is processed internally (316) and control flows back to step 310. If so, flow passes to step 320 where the message type, code and text are generated. In step 322, other packet components including source code, destination code, checksum, security code and size, etc., are appended to form the packet. In step 324, the packet is passed to the HA network driver 72.

The HA transport driver then awaits an acknowledgement that the MSG was received at its desired destination (step 326). Successful receipt is communicated to the HA application software or internally within the transport driver (step 328). If an acknowledgement is not received, then a determination is made as to whether the maximum number of permissible retries has been exceeded (step 332). If not exceeded then a re-send attempt is made (step 334). If exceed, then the failure is reported to the HA application or internally (step 336).

Figure 9:
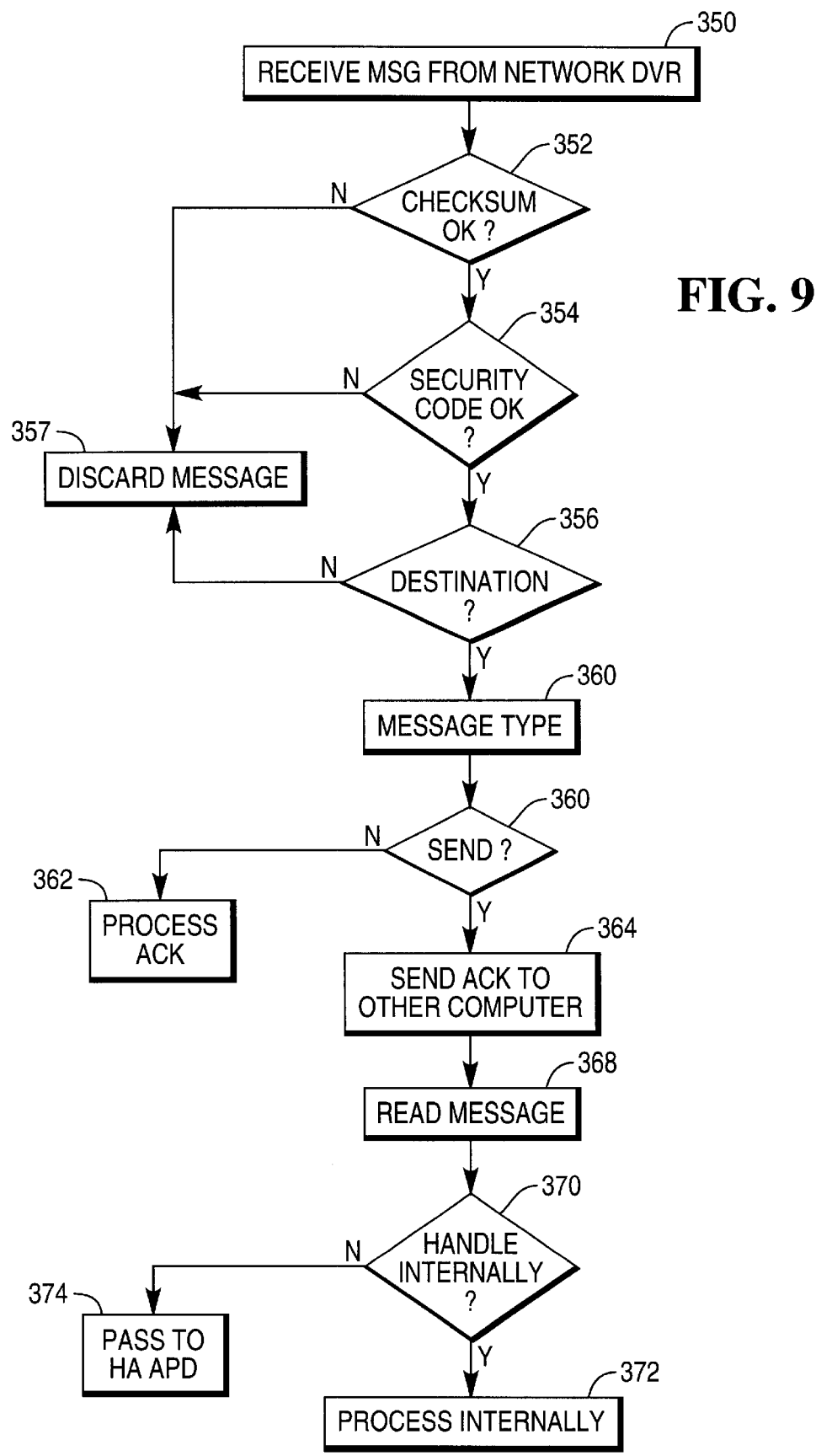
FIG. 9 a flow diagram of processing within a HA transport driver for a receive operation in accordance with the present invention.

Referring to FIG. 9, a flow diagram of processing within HA transport driver 74 for a receive operation in accordance with the present invention is shown. MSGs are received from the HA network logic in step 350. In step 352,354 and 356, the checksum, security and destination fields are respectively read and validated. If any of these validations is unsuccessful, than the MSG is discarded (step 357).

The "type" of the incoming MSG is then investigated to determine if the incoming MSG is a new MSG from another machine or an acknowledgement of a previously sent MSG (step 360). The HA transport driver processes acknowledgements accordingly (step 362) and in the case of a new MSG received from another machine, generates an acknowledgement of that MSG (step 364).

In step 368, the MSG code and text are read. In step 370, a determination is made as to whether the MSG can be handled internally within the HA transport driver. If yes, appropriate internal processing is performed (step 372). If no, the MSG is passed up to the HA application software (step 374).

From the above flowcharts and diagrams it should be evident that the HA protocol of the present invention provides: (1) routability for networked and non-networked communications; (2) reliability, incoming packets are acknowledged and outgoing packets are re-sent; (3) efficiency, the protocol identifies the best candidate communication path; (4) secure, a security key prevents unauthorized users; and (5) redundancy, while only one virtual communication path is maintained, the actual physical communication path depends on the state of all possible communication paths between the computers.

In addition, the HA protocol also preferably provides self configuration. All configurations for the HA protocol is preferably done using a configuration file or registry entries. In this embodiment, user configuration parameters are restrictive only. This means that there are default values for all possible configuration parameters (i.e., primary adapter, available media, default cluster names, etc.), which allows the HA protocol to configure itself with no user intervention. When a HA management application tells the HA protocol to initialize, the HA protocol immediately begins to establish communication with other systems in the cluster. This allows HA management applications to be installed and become immediately operational in the cluster.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A computing apparatus, comprising:
   processing logic
   a plurality of communication devices that permit said computing apparatus to communicate with another computing apparatus; and protocol logic coupled to said processing logic and said plurality of communication devices;

wherein said processing logic implements a HA protocol that monitors for a failed transmission through one of said plurality of communication devices and upon detection of such a failure, attempts to resend the content of the failed transmission through a most preferred other one of said communication devices; and wherein said protocol logic is configured to monitor a cluster within which said computing apparatus is located and report changes from the group of changes including computing apparatus failure and resource failure to the HA application software executing on said processing logic.

2. The computer apparatus of claim 1, wherein said protocol logic is configured to send an acknowledge in response to receipt of a message from another computing apparatus connected through one of said communication devices.

3. The computer apparatus of claim 1, wherein in said protocol logic creates packets suitable for network and non-network transmission of a message, said packets including one or more of the appendable information groups including destination, source, security code, checksum, message type, size, message code and message text.

4. The computer apparatus of claim 1, wherein said protocol logic creates packets suitable for network and non-network transmission of a message, said packets having destination and source fields which permit routing to a particular computing apparatus in a cluster of computing apparatus in which said computing apparatus can be provided.

5. The computing apparatus of claim 1, wherein said protocol logic creates a prioritized list of said communication devices based on failure status and use status.

6. A computing apparatus, comprising:

processing logic a plurality of communication devices that permit said computing apparatus to communicate with another computing apparatus; and protocol logic coupled to said processing logic and said plurality of communication devices;

wherein said processing logic implements a HA protocol that monitors for a failed transmission through one of said plurality of communication devices and upon detection of such a failure, attempts to resend the content of the failed transmission through a most preferred other one of said communication devices; and wherein said protocol logic is configured to commence heartbeat signal propagation at the request of HA application software executing on said processing logic, internally monitor heartbeat signals, and communicate up to the HA application software when failure has occurred.

7. The computing apparatus of claim 1, wherein said protocol logic is configured to provide a security code with a message for transmission that comes from HA application software executing on said processing logic.

8. The computing apparatus of claim 1, wherein said protocol logic attempts to resend the content of the failed communication in such a manner that HA application software executing on said processing logic is not involved in the resend.

9. The computing apparatus of claim 1, wherein said protocol logic includes automatic configuration logic that, in conjunction with protocol logic of other computing apparatuses in a cluster within which said computing apparatus is located, is capable of automatically initializing the HA components of each computing apparatus in that cluster.

10. A computing apparatus, comprising:

processing logic;

a plurality of communication devices that permit said computing apparatus to communicate with another computing apparatus; and protocol logic coupled to said processing logic and said plurality of communication devices; and wherein said processing logic implements a HA protocol and is capable of performing one or more of the group of functions including:

(1) monitoring for a failed transmission through one of said plurality of communication devices and upon detection of such a failure, attempts to resend the content of the failed transmission through a most preferred other one of said communication devices (2) generating an acknowledge in response to receipt of a message from another computing apparatus connected through one of said communication devices;

(3) associating a security code with a message for transmission that comes from HA application software executing on said processing logic;

(4) creating packets suitable for network and non-network transmission of a message;

(5) associating destination and source indicators with a message to permit routing to a particular computing apparatus in a cluster of computing apparatuses; and (6) commencing heartbeat signal propagation at the request of HA application software executing on said processing logic, internally monitoring the heartbeat signals, and communicating up to the HA application software when failure has occurred.

11. The computer apparatus of claim 10, wherein in said protocol logic creates packets suitable for network and non-network transmission of a message, said packets including one or more of the appendable information groups including destination, source, security code, checksum, message type, size, message code and message text.

12. The computing apparatus of claim 10, wherein said protocol logic creates a prioritized list of said communication devices based on failure status.

13. The computing apparatus of claim 10, wherein said protocol logic attempts to resend the content of the failed communication in such a manner that HA application software executing on said processing logic is not involved in the resend.

14. The computing apparatus of claim 10, wherein said protocol logic includes automatic configuration logic that, in conjunction with protocol logic of other computing apparatuses in a cluster within which said computing apparatus is located, is capable of automatically initializing the HA components of each computing apparatus in that cluster.

15. A method for processing in a HA cluster, comprising the steps of:

providing processing logic;

providing a plurality of communication devices that permit said computing apparatus to communicate with another computing apparatus;

monitoring with protocol logic for a failed transmission through one of said plurality of communication devices and upon detection of such a failure, attempting to resend the content of the failed transmission through a most preferred other one of said communication devices; and further comprising one or more of the steps of:

(1) associating a security code with a message for transmission that comes from HA application software executing on said processing logic;

(2) creating packets suitable for network and non-network transmission of a message;

(3) associating destination and source indicators with a message to permit routing to a particular computing apparatus in a cluster of computing apparatuses; and (4) commencing heartbeat signal propagation at the request of HA application software executing on said processing logic, internally monitoring the heartbeat signals, and communicating up to the HA application software when failure has occurred.

* * * * *